(12) United States Patent
Chattot

(10) Patent No.: US 8,027,760 B2
(45) Date of Patent: Sep. 27, 2011

(54) ENERGY-REGULATING SYSTEM FOR A VEHICLE

(75) Inventor: Eric Chattot, Meudon (FR)

(73) Assignee: Siemens SAS, St. Denis (FR)

( * ) Notice: Subject to any disclaimer, the term of this patent is extended or adjusted under 35 U.S.C. 154(b) by 268 days.

(21) Appl. No.: 12/273,992

(22) Filed: Nov. 19, 2008

(65) Prior Publication Data
US 2009/0138149 A1 May 28, 2009

Related U.S. Application Data

(63) Continuation of application No. PCT/EP2007/003237, filed on Apr. 12, 2007.

(30) Foreign Application Priority Data

May 19, 2006 (EP) .................................. 06290825

(51) Int. Cl.
G05D 13/00 (2006.01)

(52) U.S. Cl. ........................................................ 701/22

(58) Field of Classification Search .................. None
See application file for complete search history.

(56) References Cited

U.S. PATENT DOCUMENTS 3,955,657 A 5/1976 Bossi
5,669,470 A * 9/1997 Ross .............................. 191/10
6,294,886 B1 * 9/2001 Gibard ........................... 318/161
6,557,476 B2 * 5/2003 Batisse ........................... 104/289
7,430,967 B2 * 10/2008 Kumar ........................... 105/35
7,595,597 B2 * 9/2009 King et al. .................... 318/139

FOREIGN PATENT DOCUMENTS

| EP | 0 829 389 A2 | 3/1998 |
| EP | 0 968 873 A1 | 1/2000 |
| FR | 2 336 272 A1 | 7/1977 |
| WO | 2006/008391 A2 | 1/2006 |
| WO | WO 2006008391 A2 * | 1/2006 |

OTHER PUBLICATIONS

International Search Report, dated Sep. 5, 2007.

* cited by examiner

Primary Examiner — Mary Cheung
Assistant Examiner — Jerrah Edwards
(74) Attorney, Agent, or Firm — Laurence A. Greenberg; Werner H. Stemer; Ralph E. Locher

(57) ABSTRACT

An energy-regulating system for a vehicle, suitable for use in a mass transportation system between a departure station and an arrival station along a predetermined route, has advantageously a high-power electrical storage device placed on board the vehicle, supplying power to the vehicle, at least during acceleration. The energy recovered during braking of the vehicle is stored in the storage device. At least the departure station includes an electrical charging area capable of charging the storage device of the vehicle and activated in a charging mode as soon as the residual energy of the storage device of the vehicle is below a variable threshold dependent on an early estimate of the energy balance of the vehicle at least up to the arrival station.

18 Claims, 4 Drawing Sheets

ENERGY-REGULATING SYSTEM FOR A VEHICLE

CROSS-REFERENCE TO RELATED APPLICATIONS

This is a continuation, under 35 U.S.C. §120, of copending international application PCT/EP2007/003237, filed Apr. 12, 2007, which designated the United States; this application also claims the priority, under 35 U.S.C. §119, of European patent application EP 06290825.6, filed May 19, 2006; the prior applications are herewith incorporated by reference in their entirety.

BACKGROUND OF THE INVENTION

Field of the Invention

The present invention relates to an energy-regulating system for a vehicle, suitable to public transport between a departure station and an arrival station, separated by a predetermined run. The energy-regulating system contains a high-power electrical storage device, placed on board the vehicle. Energy recovered during braking of the vehicle is stored in the storage device. An electrical battery of high mass energy is placed on board the vehicle.

A global approach of energy management is provided with the purpose of reducing environmental impact and of increasing the economical performances of mass transport or public transport, such as a rail transport like a train, a subway line, a tramway, but also for a bus or any other means of transport which runs are defined in a deterministic manner.

From an environmental point of view, progress appeared, that is for example the use of tires instead of the noisy wheels of a tramway or of a classical subway. From the economical point of view, the energy cost of mass transport represents an increasing part of operational costs, for example for the propulsion or traction vehicles totally or partially powered by electrical measures. In particular, a lot of energy losses are due to the supply of electrical energy from the ground to the vehicle for example through rails, power cables or catenary systems along the run of the vehicle between two stations. Those same rails, cables or catenary systems complicate the setting up of rail network, increasing its costs and even presenting a danger of accident for pedestrians, cyclers or motorcyclists in its vicinity.

Published, European patent application EP 968 873 A1 for example discloses an energy-regulating system containing a charge of a super-capacitor (or super-capacity as a device of high-power electrical storage) on board a vehicle only when the vehicle is stationary (in a station for example). An electric generating set to power supply the super-capacitor allows a charging of the super-capacitor on the run of the vehicle after its stop.

International patent disclosure WO 2006008391A2 also discloses an energy-regulating system containing a super-capacitor and a battery on board a vehicle and presenting a method of operation where the battery is the major element providing the main traction energy and the super-capacitor provides for the additional energy needs of the battery on the run of the vehicle. Thus this system seems to present an increased deterioration of the high mass energy battery due to the high number of cycles "charging-discharging".

SUMMARY OF THE INVENTION

It is accordingly an object of the invention to provide an energy-regulating system for a vehicle which overcomes the above-mentioned disadvantages of the prior art devices of this general type, which efficiently minimizes the economical and environmental impact of an electrical traction or propulsion vehicle and is suitable for public transport.

Thus, an energy-regulating system for a vehicle is realized which is suitable to public transport between a departure station and an arrival station. The stations are separated by a predetermined run. The energy-regulating system has a high-power electrical storage device placed on board the vehicle, supplying the vehicle with a traction or propulsion power, at least during acceleration. Energy recovered during vehicle braking can be stored in the storage device which is therefore acting like a variable level power source. At least the station of departure (or of arrival) contains an area of electrical charging also capable of charging the storage device of the vehicle and is activated in charging mode from the moment the residual energy of the storage device of the vehicle is less than a variable threshold dependent on an energy balance estimated beforehand at least up to the arrival station. This threshold can depend on various parameters that govern one or several expenditures on power of the vehicle estimated for its run and/or at the station, and thus it can be set for example at least to allow the vehicle to reach the arrival station. The energy balance takes also into account possible recoveries of energy, such as coming from a kinetic energy recovered during braking along the run or upstream from the arrival station. External factors such as wind or cold can also influence consumption or additional input of energy in the balance.

The system offers several advantages. First, the power supply from ground to the vehicle is taking place in the charging area only, in particular somewhere in a station like a platform for passengers. Thus, rails, power cables or catenary systems connecting the vehicle to a power source on the ground are not essential between the stations anymore. Energy losses during the transfer of the power supply through rails, power cables or catenary systems outside the stations (along the run between the stations) are therefore eliminated very advantageously. Second, because of the absence of rails, power cables or catenary systems out of the stations, risks of power failures (loss of contact, power cut, etc) are also prevented for the vehicle. Third, the infrastructure without rails, power cables (or voltage lines) or catenary systems along the run does not anymore present electrical dangers to the pedestrians or any other cyclers crossing a tramway line for instance.

More than that, the system offers a strong economical advantage to the management of the useful energy for the vehicle, because the "ground" charging area can be wired to an electrical power source, such as an electric network, a generator like an engine or a fuel cell, an accumulator like a battery or an inertial wheel or another electrical storage device like a high-power capacitive device. It is this latest device in particular which is strongly attractive for the present system. There are high-power capacitive devices like a double-layered capacitor, more commonly called super-capacitors or super-capacities.

Such a capacitive device allows delivery of a stabilized voltage and solves a problem which has often been the cause of frequent disruptions in the running of mass transport systems in the past. If several vehicles were accelerating simultaneously, the voltage on the line (along the run) could decrease below a critical threshold and cause a failure of the protective circuits and bring about a halting of the vehicles. The return to a normal running could then take some time; which somewhat inconveniences the passengers of the vehicle. With the high-power capacitive device, also known under the name SITRAS SES®, when the voltage on the line decreases below a minimum, the storage system is discharging itself and is supplying the line with power to stabilize the voltage.

The concept of energy storage of the present invention throws advantageously off the line under voltage, because it consists of at least such an on-board element of storage (that is a super-capacitor or super-capacity for instance), in addition to a ground storage device about a charging area, for example like a SYTRAS SES system (super-capacitor) in a station. This also enables to offer greater answer flexibility to the various running needs of public transport.

In particular, the charging area can contain, on a finite length of the vehicle run in the station (for instance on a longitudinal portion parallel to the station platform), an electric contact coupling the vehicle storage device and the ground storage device about the charging area, ideally by at least one traction rail or of a catenary system with contact slipper, or through an inductive terminal without contact slipper. Thus, only an electric contact between the vehicle and the ground is done in the limited-sized charging area. On any other portion of the vehicle run, no electric contact between the vehicle and the ground is then necessary.

The finite length of the charging area can be variable upstream and/or downstream from a stop point of the vehicle in the station, ideally by stretching of the electrical charging area for instance by adding traction rails around the charging area commonly sized for average runs. The aspect of an extensible charging area is a choice asset, for example if an energy consumption estimated greater for the next run is anticipated (especially if a slope is to be considered). Of course, the opposite situation is also conceivable, in the case for example where a slope would cause an energy contribution (through braking) an independent way for the vehicle, and so a reduced size of the charging area, so a simplification of the infrastructure.

Generally and for actual technological reasons concerning the physical properties of the super-capacitors (as an on-board storage device), a high mass energy battery is also on board the vehicle and supplies the vehicle with an additional electrical energy regarding the vehicle storage device, in particular at a constant speed of the vehicle.

Thus, it is possible to use advantageously the battery (good storage capacity, but low power and limited number of "charging-discharging" cycles) and the on-board super-capacitor (high power, but low storage capacity, high number of cycles) within the scope of a transport system with a very regular running. Among others, there are actual researches that are aiming to create "pseudo-capacitors" or any other technology called "hybrid" combining the physical properties of a battery and of a super-capacitor. Therefore such a component also enters in the scope of the invention. The complementarity of physical properties, well known for a battery and a super-capacitor, is important.

One of the strategies of optimal energy management can then lead to such a process of energy regulation which includes: use the on-board super-capacitor during the phase of acceleration of the vehicle (because of high power needs), use the battery after the phase of acceleration of the vehicle, send energy recovered during the braking back in the on-board super-capacitor (efficiency of a super-capacitor greater than 85%), and keep a low rate of battery discharging (5 to 10% of its capacity for instance) by maximizing for example the use of the on-board super-capacitor at each station or inter-station, which limits the wear of it.

In order not to prematurely damage the battery and the on-board super-capacitor, an overload (in the sense of electrical recharging) of these on-board storage devices must be avoided. In particular, if the on-board system is fully recharged while being in the charging area, the ground recharging must be inactivated. Likewise, during a phase of braking of the vehicle on its run or even while arriving at the charging area of the arrival station, the recovery of kinetic energy must be possible at any moment. An anticipation of the recharging of the on-board storage device is also planned, in order for example to limit a recharging at the departure station, if a low consumption on the run following the station is expected, which is the case for instance for a vehicle on a run containing a slope that limits greatly the discharging of the on-board storage device up to the arrival station.

This anticipation can also take into account the self-recharging of the vehicle with the braking energy recovered up to the arrival station.

An energy transfer control unit can also be placed on board to manage the energy flows between the different systems of the vehicle and/or between the vehicle and the ground equipments. Among other things in an open-ended list, it is about the battery, the vehicle super-capacitor, the electric drive, the auxiliary equipments (air-conditioning, lighting, etc.), the power supply rail, the ground storage device. It is the control unit that decides for instance during braking whether all the power available by regeneration is routed towards the on-board super-capacitor or if part of it is used to recharge the battery.

So, the battery can occasionally charge the vehicle storage device (super-capacitor) or power supply another source of energy consumption of the vehicle (air-conditioning, lighting, etc.).

At best, a discharging of the battery (for example of less than 10% according to the actual technology) below a threshold of best efficiency of the battery (for instance of about 80-85% of its capacity) is kept occasional and of small extent below the threshold to spare the battery life.

However, it can occasionally happen that, to the detriment of the battery life, a discharging of the battery appears to be forced beyond the previous small extent (for example, a necessary discharge of 20% dragging the battery capacity to 70%) in at least one of the following cases, called "degraded mode": in emergency mode or in recharging mode of the vehicle storage device, in particular for a start of the vehicle; in emergency mode of a charging area suddenly out of order; and in propulsion or traction mode of another vehicle.

These cases must nevertheless be avoided and at least controlled. This is possible thanks to a control unit of calibration and of maintenance of the energy levels and transfers that can be placed on board the vehicle, and also with a remote-access facility through a suitable communication device, for example during the motion of the vehicle, at a station or at a maintenance station.

Likewise, it is possible to do a charging of the battery by recovery of the vehicle braking energy and/or directly at the station in the ground charging area (super-capacitor or any other proper charging device). Any other additional power source can be used, such as a solar panel on the vehicle roof.

The system of the present invention can also contain a calculator of energy forecast on the basis of several parameters between the stations and capable of being placed on board the vehicle (or put in communication with an external main unit if need be) and put in communication with a control unit at the charging area and/or vice versa. Vice versa means that the control unit at the charging area can then be placed on board, in addition to or instead of the calculator according to the infrastructure required or imposed.

In particular, the parameters are various and variable or updatable for a greater flexibility of the system control. Generally, there are of a kinetic nature—length and relief of the run, speed required or possible, weight of the vehicle and of the passengers, etc—and environmental—air-conditioning level according to an external temperature, internal and external lighting of the vehicle, communication or safety systems for the passengers, etc-.

Finally, the calculator can be connected to a control unit with priority levels in order to compensate for high energy consumption related to priority parameters by energy savings related to secondary parameters. Thus, the intelligence of the energy-regulating system is increased, for instance to avoid constraints of logistic nature related to vehicle(s) traffic or for reasons of safety, of convenience, etc.

One simple example of this case consists, in the case of malfunctioning of a charging area at one of the stations, in that the calculator reduces the speed on a later run of the vehicle, an exact manner so that with a lesser autonomy, it reaches nevertheless the next charging area. Subsidiary systems of emergency and placed on board the vehicle, like the battery, can also be involved. Other systems that are energy consumers (for example for the passengers' convenience) can be very temporarily stopped or run in "economy" mode.

It is also possible to be provided with at least one additional charging area on the run between the departure station and the arrival station, in particular allowing a recharging of the vehicle storage device without stopping the vehicle. This implies the setting up for example of a traction rail with a limited length, enough to enable an intermediate charging up to the next charging area.

Ideally of course, each station should contain a charging area. However, according to the characteristics of the run, it is possible that the super-capacitor of the on-board storage device is sufficient without energy input from a station ground system for several consecutive runs.

In case of coupling of at least two vehicles, it is conceivable that the tractor and/or propeller vehicle will have partially or in its entirety to supply the propulsion energy and/or recover partially or in its entirety the braking energy for the whole set of coupled vehicles.

Other features which are considered as characteristic for the invention are set forth in the appended claims.

Although the invention is illustrated and described herein as embodied in an energy-regulating system for a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
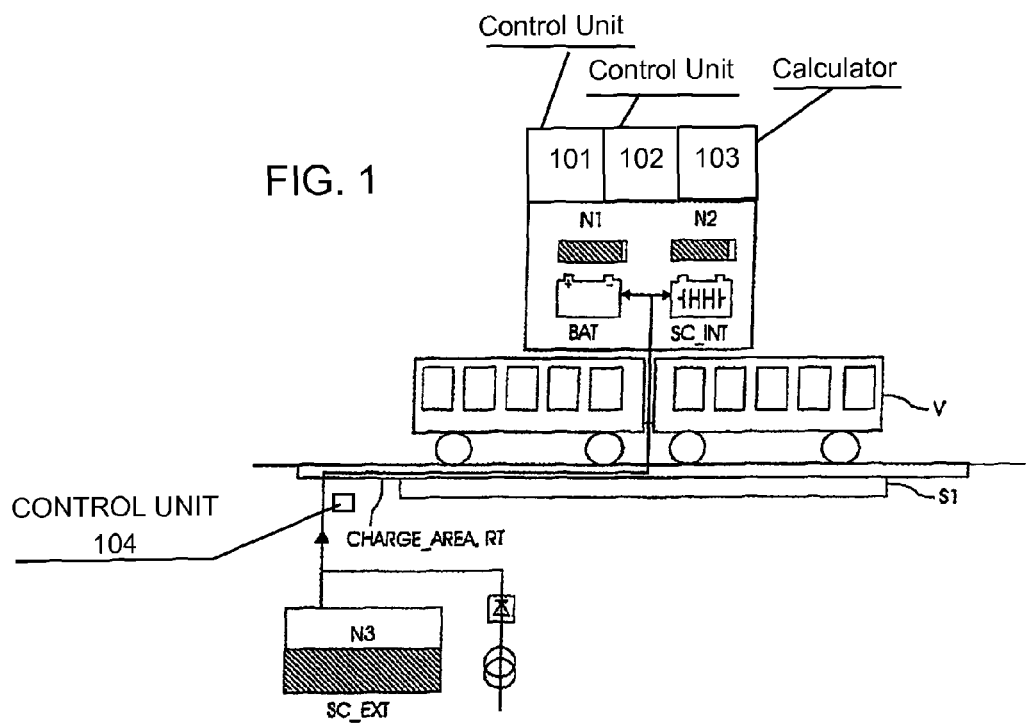
FIGS. 1 to 6 are diagrammatic, illustrations of an energy-regulating system and operating process for a vehicle on a run between two stations according to the invention.
Figure 2:
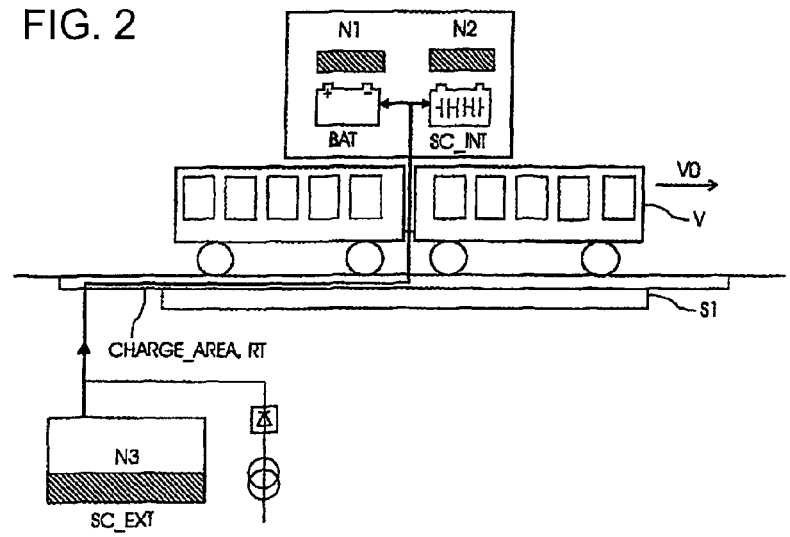
Figure 3:
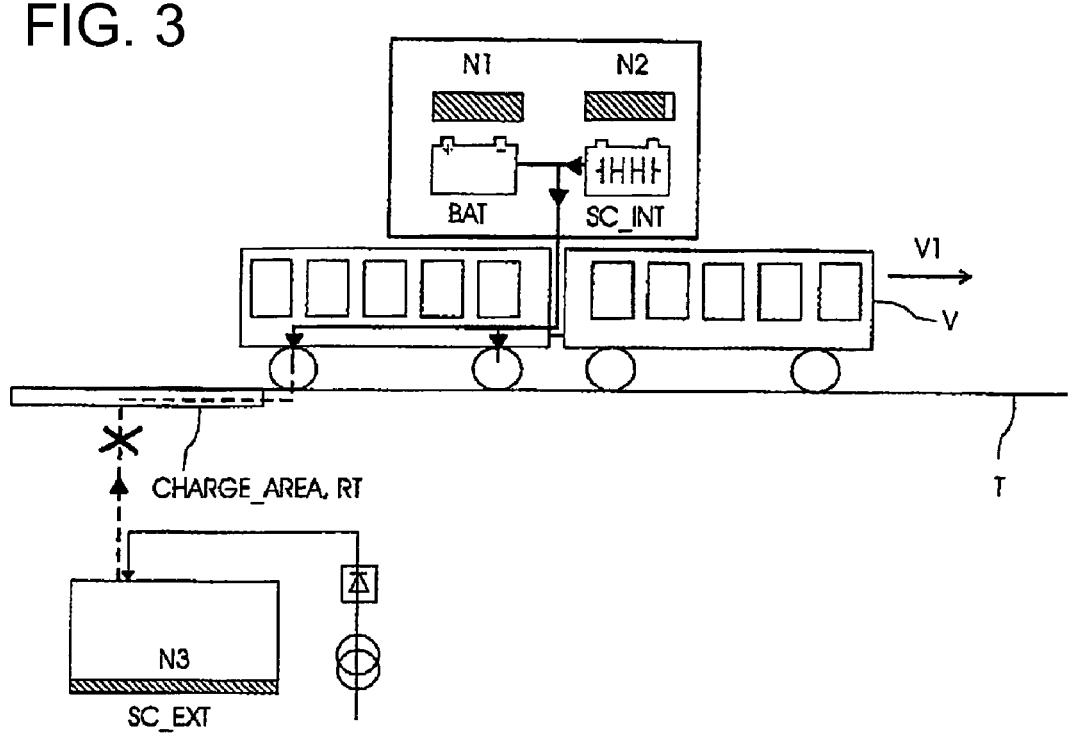
Figure 4:
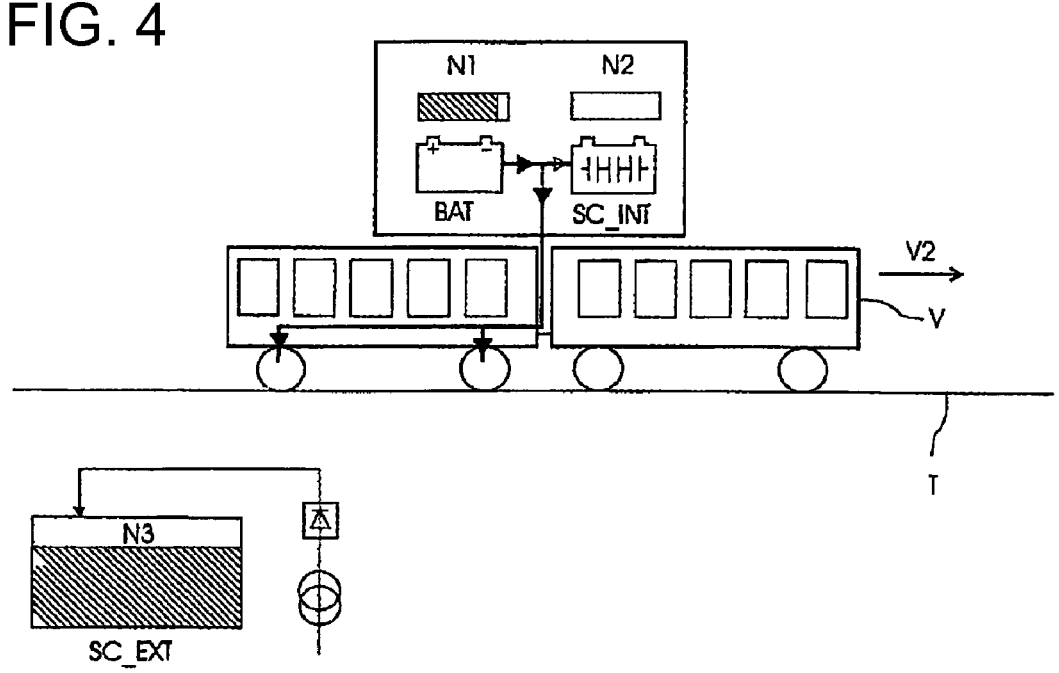
Figure 5:
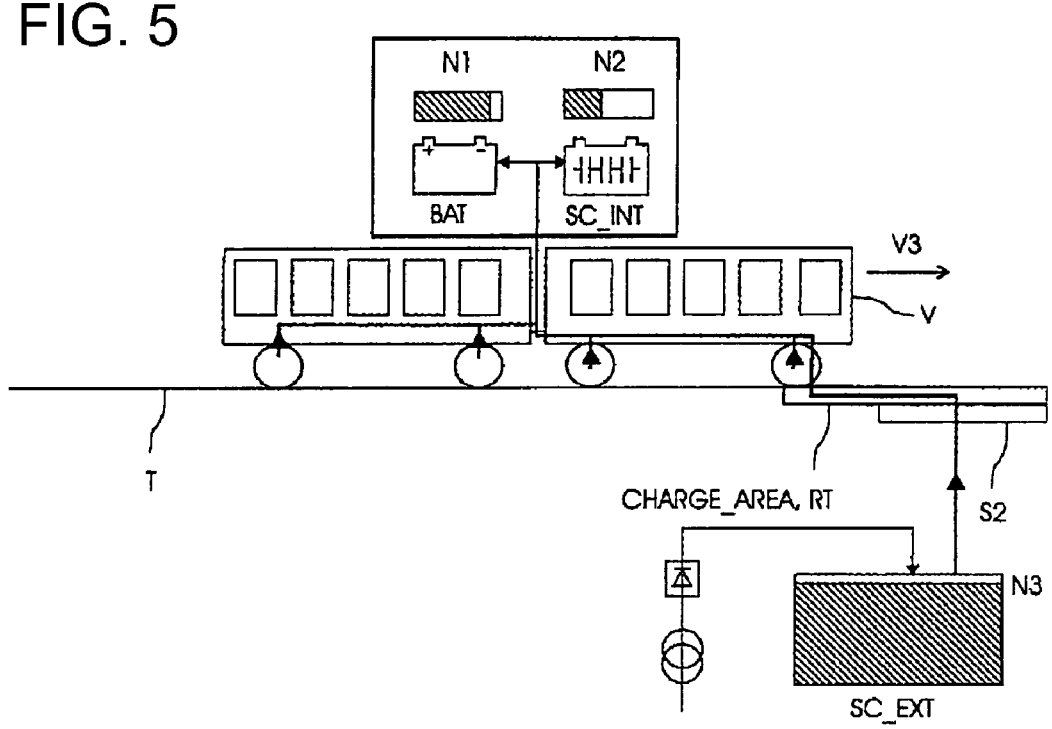
Figure 6:
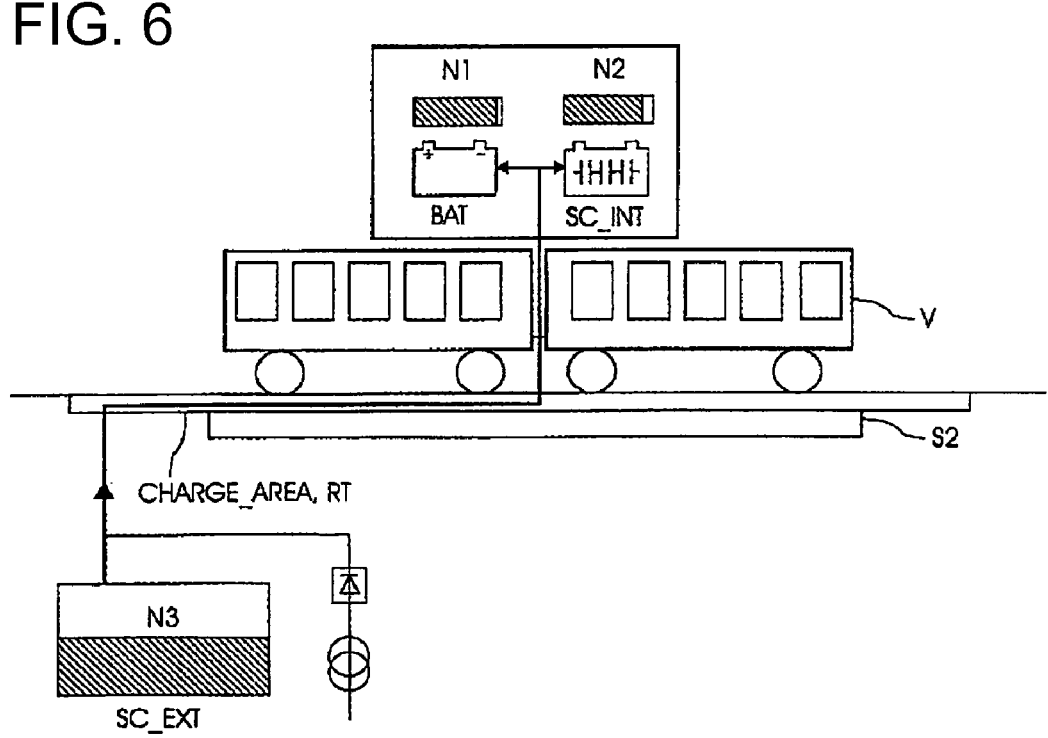

Referring now to the figures of the drawing in detail and first, particularly, to FIGS. 1-6 thereof, there is shown an example of an energy-regulating system described previously as well as an operating process of the system for a vehicle V on a run T between a departure station S1 according to FIGS. 1 and 2 and an arrival station S2 according to FIGS. 5 and 6. The stations S1, S2 contain for instance a platform (along the length of stations S1, S2) for the passengers such as a classical station stop for a subway, a tramway, a bus, etc. A high-power electrical storage device, here a super-capacitor SC_INT with a charge level N2 (no hatching=minimum level; if hatching=higher level), is placed on board the vehicle supplying the vehicle with traction power. In this example, a battery BAT (with high mass energy contrary to the super-capacitor) with a charge level N1 is also placed on board the vehicle. Here, the vehicle contains two cars of which one at least is a tractor or propeller. Through a traction rail RT on the ground along the platform, an electrical contact is formed between the vehicle and a second super-capacitor SC_EXT (on the ground) like a SITRAS SES system previously mentioned with a charge or energy storage level N3. This way, along the length of the traction rail, the departure station contains an electrical charging area CHARGE_AREA capable of charging the storage device SC_INT of the vehicle and that is activated in charging mode as soon as the residual energy, that is the level N2 of the storage device SC_INT of the vehicle, is less than a variable threshold. Likewise, the charging area CHARGE_AREA can equally charge the battery. In the figures, the energy flows are represented by bold arrows and explicitly show the various energy transmitters and receivers.

In FIG. 1, the vehicle is stationary in the departure station S1. The power supply by the rail RT assisted by the SITRAS SES system with the ground super-capacitor SC_EXT completes the charging of the super-capacitor SC_INT on board the vehicle V and if necessary of the battery BAT.

In FIG. 2, the vehicle starts with an increasing speed V0 (acceleration) and the power supply from the rail assisted by the SITRAS SES system supplies with the necessary power at the start, because as long as the contact through the rail RT is possible, the maximum of energy from the ground super-capacitor SC_EXT must be used to save the on-board super-capacitor SC_INT. Furthermore, the on-board super-capacitor SC_INT and the battery BAT are kept on load. This way, to the detriment of a decrease of the level N3 of the ground super-capacitor SC_EXT, the levels N1, N2 of the battery and of the on-board super-capacitor SC_INT stay respectively at a proper or maximum level of charge.

FIG. 3 represents the phase where the contact between the vehicle V (for instance, through its most downstream wheel) and the rail RT is broken, because the vehicle goes into the run T out of the departure station S1. Along the run T between the departure station S1 and the arrival station S2, the vehicle is independent and therefore electrically isolated from a power source external to the vehicle.

Thus, after having left the station S1 with a reached speed V1>V0, all the necessary power for the traction of the vehicle and the auxiliary equipments of the vehicle (air-conditioning, lighting, control systems, navigation system if the vehicle is driven without a driver, etc) is supplied by the on-board super-capacitor SC_INT and by the battery BAT if necessary. The SITRAS SES system with a lower level of storage N3 is going to be recharged while waiting for the arrival of the next vehicle.

FIG. 4 shows the vehicle on the run T, after its acceleration and a phase at a stabilized speed V2, which is about to slow down as the arrival station S2 is approaching. The level N2 of the on-board super-capacitor SC_INT can then be at its minimum. If additional power is necessary, the battery BAT will take over such as previously described. As soon as the braking is activated, the speed V2 decreases, but the recovered kinetic energy is channeled towards the on-board super-capacitor SC_INT and/or the battery. The braking energy can then be stored advantageously in it (up to 40% of the kinetic energy is recovered). Moreover, during these phases, the SITRAS SES system or systems with a ground super-capacitor SC_EXT is/are recharged (level N3 increasing) and is/are ready for the arrival of an approaching vehicle.

The arrival at the station S2 is represented on FIG. 5 for the vehicle V at a braking speed V3. The front of the vehicle is first in contact with the traction rail RT (for example through a contact slipper between the vehicle and the rail on the ground) which is already going to enable to complete the charging of the on-board storage device SC_INT, BAT, thanks to the ground super-capacitor SC_EXT charged at a high level N3, this before the coming of the vehicle to a complete stop. Other uses of the energy stored in the ground super-capacitor SC_EXT can be considered, such as to supplement the on-board storage device SC_INT, BAT of the vehicle if another vehicle is stuck in the station or to allow other mechanical actions requiring high power. To sum up, braking energy and power supply from the rail assisted by the SITRAS SES system are recharging the on-board super-capacitor SC_INT and the battery BAT if necessary but can also be used as additional power as long as the vehicle is in the charging area.

Again, as FIG. 6 is showing it the same way as FIG. 1, the vehicle then stops in the station to allow the passengers to get on or down. During this lapse of time, the charging of the on-board super-capacitor SC_INT and of the battery BAT if necessary is done by the super-capacitor SC_EXT which level of charge N3 then decreases again, to meet the objectives of deterministic nature of a next run.

Figure 7:
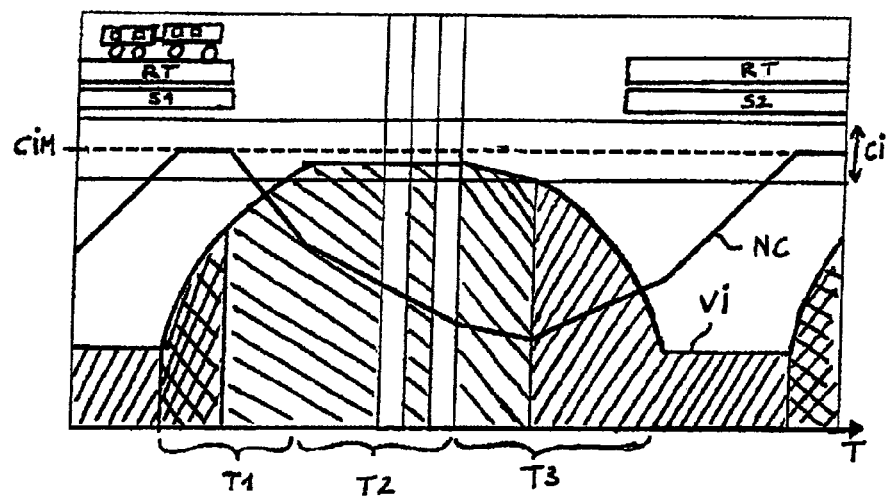
FIG. 7 is a charge level according to speed for the vehicle on a run between the two stations and FIG. 8 shows an additional charging area.

FIG. 7 represents an example of level of charge NC of the on-board super-capacitor SC_INT according to the speed VI of the vehicle V on a run T between two stations S1, S2 (each with a traction rail RT) referring to FIGS. 1 to 6. The hatching rising to the right symbolizes a charging of the on-board super-capacitor SC_INT (and/or of the battery), the simple hatching rising to the left symbolizes a discharging of the on-board super-capacitor SC_INT (and/or of the battery) and the crossed hatching symbolizes the upholding (non-use) of the on-board super-capacitor SC_INT (and/or of the battery).

At the departure station S1, the train is stationary (speed VI constant because equal to zero, while the charging is taking place up to a targeted charge threshold CIM inside an interval CI also called targeted interval according to the given power objectives), then during its acceleration phase of duration T1, the level of charge NC stays constant as long as a contact or a ground-to-vehicle energy transfer is still possible. When the vehicle has passed the traction rail (that is the possible charging area), only the own on-board super-capacitor SC_INT is involved to carry on the acceleration phase T1 that requires high power. That way, the power switches between the two super-capacitors on the ground, then on-board are ensured. During a later phase of duration T2, the speed VI stays constant. Here, a power effort is not necessarily useful, if the ground is flat for instance. Uses of the battery instead of or in a mode to compensate for the on-board super-capacitor SC_INT can then be done preferably in a brief way. During that phase, the level of charge NC of the vehicle decreases irremediably, in such a way that at least the speed VI be maintained constant at an expected value.

During a final phase of slowing down by braking of duration T3 on the run T, the level of charge increases again by recovery of the vehicle kinetic energy. So the vehicle has left the departure station with a level of charge NC located in the target zone CI and that has to come back to its initial level inside the same target zone CI as far as possible during its departure from the next station S2. In case the battery is necessary, the target zone CI corresponds to a variation between 5 and 10% of the rated charge to ensure more than 300,000 cycles on actual batteries. The super-capacitors have longer life cycles, between 500,000 and 1 million according to the actual technology.

An energy transfer control unit 101 can also be placed on board to manage the energy flows between the different systems of the vehicle V and/or between the vehicle V and the ground equipments. Among other things in an open-ended list, it is about the battery BAT, the vehicle super-capacitor SC_INT, the electric drive, the auxiliary equipments (air-conditioning, lighting, etc.), the power supply rail RT, and the ground storage device, namely the second super capacitor SC_EXT. It is the control unit 101 that decides for instance during braking whether all the power available by regeneration is routed towards the on-board super-capacitor SC_INT or if part of it is used to recharge the battery BAT.

To prevent and/or control undesirable discharge levels of the battery BAT, a control unit 102 of calibration and of maintenance of the energy levels and transfers may be placed on board the vehicle V. This control unit 102 cooperates with a remote-access facility through a suitable communication device, for example during the motion of the vehicle V, at a station S1,S2 or at a maintenance station.

The system of the present invention can also contain a calculator 103 of energy forecast on the basis of several parameters between the stations S1, S2 and capable of being placed on board the vehicle V (or put in communication with an external main unit if need be) and put in communication with a control unit 104 at the charging area CHARGE_AREA and/or vice versa. Vice versa means that the control unit 104 at the charging area can then be placed on board, in addition to or instead of the calculator 103 according to the infrastructure required or imposed.

Figure 8:
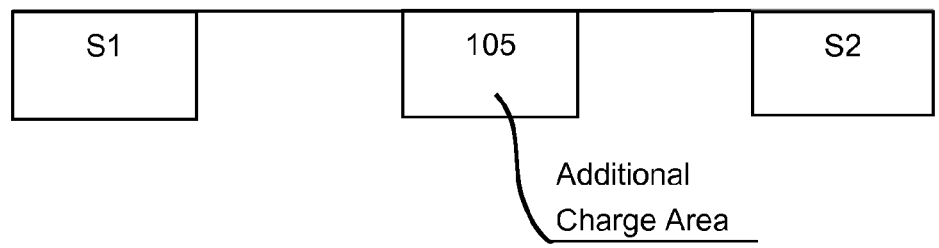

FIG. 8 shows that it is also possible to be provided with at least one additional charging area 105 on the run between the departure station S1 and the arrival station S2, in particular allowing a recharging of the vehicle storage device SC_INT without stopping the vehicle V. This implies the setting up for example of a traction rail with a limited length, enough to enable an intermediate charging up to the next charging area.

The invention claimed is:

1. An energy-regulating system for a vehicle suitable for public transport between a departure station and an arrival station, the departure station separated from the arrival station by a predetermined run, the energy-regulating system comprising:

a high-power electrical storage device placed on board the vehicle and any energy recovered during braking of the vehicle is stored in said storage device;

an electrical battery of high mass energy placed on board said vehicle and electrically connected to said storage device;

an electrical charging area disposed at the departure station for charging said storage device on the vehicle, said electrical charging area being activated in charging mode from a moment residual energy of said storage device of the vehicle is less than a variable threshold dependent on an energy balance of the vehicle estimated beforehand at least up to the arrival station;

said high-power electrical storage device connected to primarily supply electrical power to the vehicle with traction power, at least during an acceleration phase; and said electrical battery of high mass energy connected to secondarily supply the vehicle with the electrical power in an additional way to said storage device of the vehicle at a constant speed of the vehicle.

2. The system according to claim 1, wherein:
said electrical charging area has an electrical power source selected from the group consisting of an electric network, a generator, an engine, a fuel cell, an accumulator, a battery, an inertial wheel, another electrical storage device and a high-power capacitive device; and
said electrical charging area contains, along a finite length of the predetermined run, an electrical contact coupling said storage device of the vehicle and said electrical power source, by means of one of a traction rail and a catenary system with contact slipper, or through an inductive terminal without a contact slipper.

3. The system according to claim 2, wherein the finite length is a variable upstream and/or downstream from a stop point of the vehicle in the station for stretching the electrical charging area.

4. The system according to claim 1, wherein while on the predetermined run between the departure station and the arrival station, the vehicle is electrically isolated from any power source external to the vehicle.

5. The system according to claim 1, further comprising an energy transfer control unit for controlling energy transfer between said battery, said storage device and a driving part of the vehicle, and during braking, a regenerated energy can be routed to recharge independently at least one of said battery and said storage device on the vehicle.

6. The system according to claim 1, wherein occasionally said battery charges said storage device of the vehicle and supplies other sources of energy consumption of the vehicle.

7. The system according to claim 6, wherein a discharging of said battery below a threshold of a best battery efficiency is allowed only occasionally and only to a small extent below said threshold to spare battery life.

8. The system according to claim 7, wherein occasionally and to a detriment of the battery life, a battery discharging is forced beyond the small extent in at least one of the following cases:
in an emergency mode or of recharging of the vehicle storage device, including a departure of the vehicle;
in an emergency mode where the electrical charging area is out of order; and
in propulsion or traction mode of another vehicle.

9. The system according to claim 6, wherein a charging of said battery is done by recovery of braking energy on the predetermined run and/or in a station.

10. The system according to claim 6, further comprising a control unit for calibration and maintenance of energy levels and transfers is placed on board the vehicle.

11. The system according to claim 1, further comprising a calculator of energy forecast performed on a basis of several parameters between the stations, the calculator placed on board the vehicle and put in communication with a control unit at said electrical charging area and/or vice versa.

12. The system according to claim 11, wherein the several parameters include those of:
a kinetic nature including: length and relief of the predetermined run, speed required or possible, weight of the vehicle and of passengers; and
an environmental nature including: a level of air-conditioning according to an external temperature, internal and external lighting of the vehicle, communication systems and safety systems for the passengers.

13. The system according to claim 11, wherein said calculator is connected to a control unit with priority levels in order to compensate for strong energy consumption related to priority parameters by energy savings related to secondary parameters.

14. The system according to claim 11, wherein in case of malfunctioning of a charging area at one of the stations, said calculator reduces a speed on a later run of the vehicle.

15. The system according to claim 1, further comprising at least one additional charging area is placed on the predetermined run between the departure station and the arrival station for recharging of said storage device without stopping the vehicle.

16. The system according to claim 1, wherein said storage device of a first vehicle supplies and/or stores its own electrical energy and/or that of at least one other vehicle pulled or pushed by the first vehicle.

17. The system according to claim 16, wherein said storage device of the first vehicle supplies and/or stores the electrical energy of at least one other vehicle pulled or pushed by the first vehicle.

18. The system according to claim 1, wherein said storage device is a super-capacitor.

\* \* \* \* \*